Jan. 1, 1924
R. J. MEYER
ANIMAL TRAP
Filed Dec. 28, 1921
1,479,509
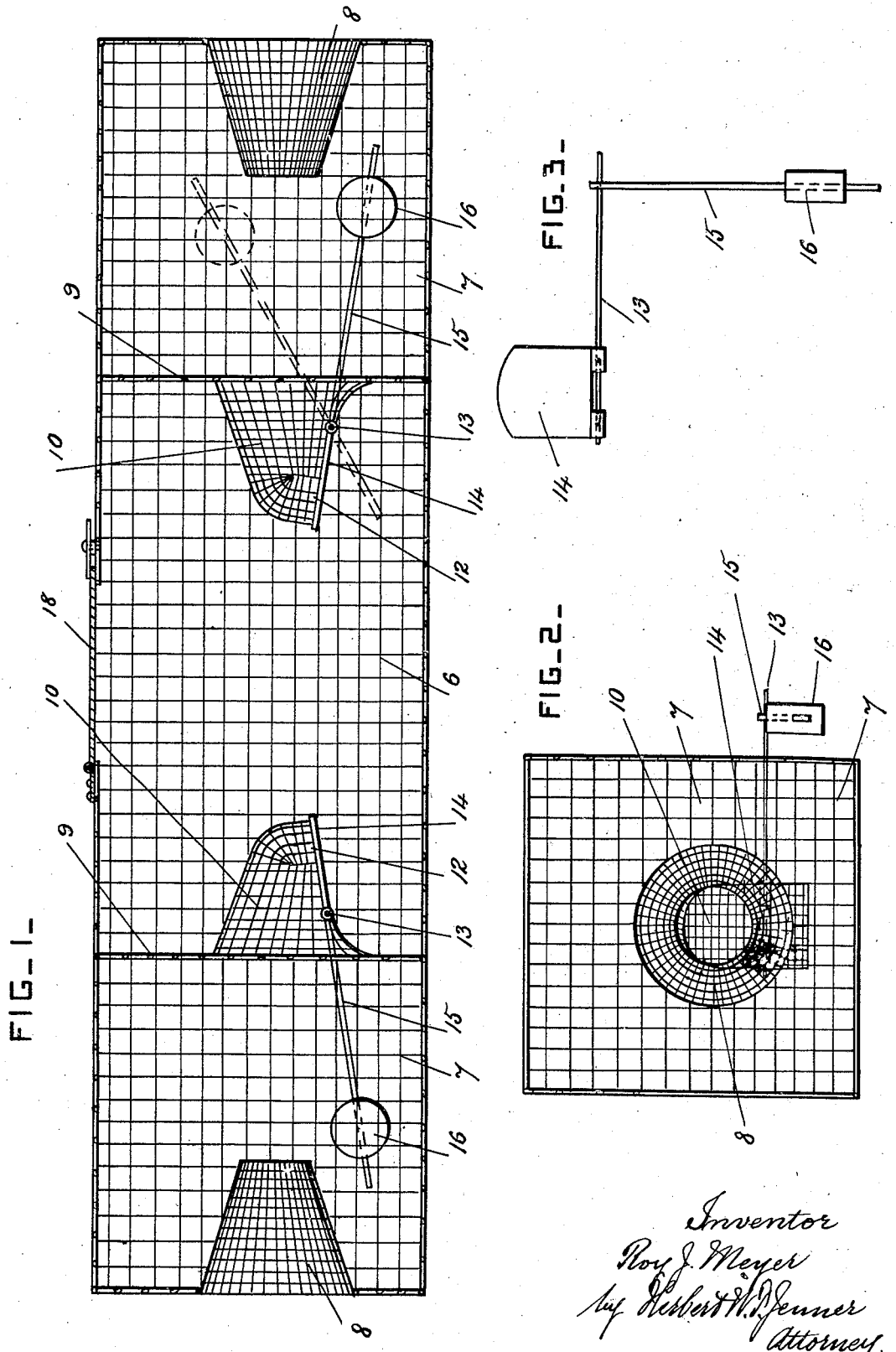

Patented Jan. 1, 1924.

1,479,509

UNITED STATES PATENT OFFICE.

ROY J. MEYER, OF LENORA, KANSAS.

ANIMAL TRAP.

Application filed December 28, 1921. Serial No. 525,426.

*To all whom it may concern:*

Be it known that I, ROY J. MEYER, a citizen of the United States, residing at Lenora, in the county of Norton and State of Kansas, have invented certain new and useful Improvements in Animal Traps, of which the following is a specification.

This invention relates to traps for small fur-bearing animals, such as pole-cats, which live in holes in the ground; and it consists in the novel construction and combination of the parts hereinafter fully described and claimed.

In the drawings, Figure 1 is a longitudinal section through a trap constructed according to this invention. Fig. 2 is an end view of the trap. Fig. 3 is a detail plan view of the automatic door.

The trap has a large rectangular main chamber 6 at its middle part, and an ante-chamber 7 at each end of the main chamber. The whole trap is preferably made of wire-work. Each ante-chamber has a conical inlet passage or member 8 at its end. Each inlet passage 8 is preferably substantially circular in cross-section, but may be made of various other forms, and it is made of a size which will permit the animal to pass freely into the ante-chamber, and which will materially hinder or prevent it from passing out through the same passage or inlet member.

Each partition 9 between the ante-chambers and the main chamber has a converging inlet passage or member 10 which projects within the main chamber 6, and which has its large end at the partition. This passage 10 has an opening 12 at the lower part of its smaller end portion, and 14 is an automatically-closing door which opens inwardly, and which is pivoted to the passage or inlet member 10 by a pin 13. The door 14 has an arm 15 which projects from its pivot outside the trap, and 16 is a weight adjustably secured on the arm and operating to hold the door closed.

The two inlet members 8 and 10 are preferably arranged substantially in line with each other. The bait is put in the main chamber, and the main chamber has a hinged door 18 in any convenient position. The animals are removed forcibly through the door 18, which is provided with any suitable fastening device for normally holding it closed.

A similar ante-chamber with an inlet cone is provided at each end of the trap because when the animals live in holes it cannot be found out whether they are in their holes or not. If they are in, they will be certain to come out; and if they are out, they will do their best to get in. The animals pass through the open outer inlet members or passages 8 easily and without hesitation, and when in the ante-chambers they find it easier, and more in the right direction, to pass through the inner passages 10 and operate the automatic doors, than to get out through the outer passages.

The main chamber and its ante-chambers are made of any suitable dimensions, according to the size of the animals for which the trap is intended.

What I claim is:

1. In a trap, a single, rigid and continuous body portion formed of wire work and provided with two transverse partitions which divide it into a single main chamber and two ante-chambers, the said main chamber being adapted to contain the bait and to receive animals from both ante-chambers and being provided with a door for the removal of the animals, conical inlet members which project within the ante-chambers from the opposite ends of the said body portion, and converging inlet members provided with automatically-closing outlet doors, said inlet members being secured to the said partitions and projecting within the said main chamber.

2. In a trap, a single, rigid and continuous body portion formed of wire work and provided with two transverse partitions which divide it into a single main chamber and two ante-chambers, the said main chamber being adapted to contain the bait and to receive animals from both ante-chambers and being provided with the door for the removal of the animals, conical inlet members which project within the ante-chambers from the opposite ends of the said body portion, converging inlet members provided with pivoted doors at their smaller ends, and adjustable weights for closing the said doors automatically, the said inlet members being secured to the said partitions and projecting within the said main chamber.

In testimony whereof I have affixed my signature.

ROY J. MEYER.